United States Patent
Lee

(10) Patent No.: US 10,308,543 B2
(45) Date of Patent: Jun. 4, 2019

(54) CUTTING METHOD AND CUTTING STAGE OF TOUGHENED GLASS

(71) Applicant: Samsung Corning Precision Materials Co., Ltd., Gyeongsangbuk-do (KR)

(72) Inventor: Jae Chang Lee, ChungCheongNam-Do (KR)

(73) Assignee: Corning Precision Materials Co., Ltd. (KR)

( * ) Notice: Subject to any disclaimer, the term of this patent is extended or adjusted under 35 U.S.C. 154(b) by 629 days.

(21) Appl. No.: 13/951,038

(22) Filed: Jul. 25, 2013

(65) Prior Publication Data
US 2014/0042202 A1 Feb. 13, 2014

(30) Foreign Application Priority Data
Aug. 8, 2012 (KR) .................. 10-2012-0086823

(51) Int. Cl.
*C03B 33/03* (2006.01)
*C03B 33/033* (2006.01)

(52) U.S. Cl.
CPC ............ *C03B 33/033* (2013.01); *C03B 33/03* (2013.01); *B65G 2249/04* (2013.01); *Y02P 40/57* (2015.11); *Y10T 83/0341* (2015.04); *Y10T 83/343* (2015.04); *Y10T 225/12* (2015.04)

(58) Field of Classification Search
CPC ..... C03B 33/03; C03B 33/033; Y10T 225/12; Y10T 83/0341; Y10T 83/343
USPC .......... 225/2, 93, 95, 96, 96.5, 97, 104, 880; 83/17, 18, 20, 21, 176
See application file for complete search history.

(56) References Cited

U.S. PATENT DOCUMENTS

| 4,471,024 A | * | 9/1984 | Pargamin | ............... C03C 21/00 |
| | | | | 174/137 B |
| 8,844,782 B2 | * | 9/2014 | Brown | ............................. 225/2 |
| 2005/0221044 A1 | | 10/2005 | Gaume et al. | |

(Continued)

FOREIGN PATENT DOCUMENTS

| CN | 1930097 A | 3/2007 |
| CN | 101128294 A | 2/2008 |
| JP | 2010229005 A | * 10/2010 |

(Continued)

OTHER PUBLICATIONS

Chan (Basic structural design considerations and properties of glass and aluminum structures, http://www.hkisc.org/proceedings/2006421/11_SLChan%20facade2006b.pdf) (Year: 2007).*

(Continued)

*Primary Examiner* — Andrea L Wellington
*Assistant Examiner* — Liang Dong
(74) *Attorney, Agent, or Firm* — Lerner, David, Littenberg, Krumholz & Mentlik, LLP

(57) ABSTRACT

A cutting method and cutting stage of toughened glass with which a piece of toughened glass is divided into unit pieces of toughened glass. The cutting method cuts a piece of toughened glass which is strengthened by forming a compressive stress in the surface of a raw glass plate. The method includes the steps of reducing the central tension inside a cutting portion of the piece of toughened glass that is to be cut by concavely bending the cutting portion; and cutting the piece of toughened glass by forming a median crack in the cutting portion.

8 Claims, 5 Drawing Sheets

(56) References Cited

U.S. PATENT DOCUMENTS

| | | | |
|---|---|---|---|
| 2011/0095062 A1* | 4/2011 | Maekawa | 225/2 |
| 2011/0226832 A1* | 9/2011 | Bayne et al. | 225/2 |

FOREIGN PATENT DOCUMENTS

| | | | | |
|---|---|---|---|---|
| JP | 2012020902 A | * | 2/2012 | |
| KR | 20050016393 A | | 2/2005 | |
| TW | 201111310 A | | 4/2011 | |
| TW | 201112351 A | | 4/2011 | |
| WO | WO-2011144024 A1 | * | 11/2011 | C03C 3/095 |

OTHER PUBLICATIONS

"Glass Basics: Scoring and separating recommentations—Technical Information Paper", TIP 305, Issued: Nov. 2004, 3 pages.

* cited by examiner (a)  (b)

(a)          (b)

CUTTING METHOD AND CUTTING STAGE OF TOUGHENED GLASS

CROSS REFERENCE TO RELATED APPLICATION

The present application claims priority from Korean Patent Application Number 10-2012-0086823 filed on Aug. 8, 2012, the entire contents of which are incorporated herein for all purposes by this reference.

BACKGROUND OF THE INVENTION

Field of the Invention

The present invention relates to a cutting method and cutting stage of toughened glass, and more particularly, to a cutting method and cutting stage of toughened glass with which a piece of toughened glass is divided into unit pieces of toughened glass.

Description of Related Art

Glass products are indispensable components in a variety of technological and industrial fields, involving image and optical equipment, such as monitors, cameras, video tape recorders (VTRs), mobile phones and the like, transportation equipment, such as vehicles, various types of tableware, construction facilities, and the like. Accordingly, glass products having a variety of physical properties that meet the requirements of respective industrial fields are manufactured and used.

In particular, due to rapid distribution of smart phones, the use of touch screen panels mainly in mobile displays is rapidly increasing. Since these touch screen panels require high light transmittance and mechanical endurance considering their functions, a cover glass or cover window is made of toughened glass.

Toughened glass is manufactured by a physical toughening method, also referred to as air-cooled toughening, which is mainly applied to the safety glass of a vehicle or a chemical toughening method. The chemical toughening method can be usefully applied to a thin glass sheet that has a complicated shape or a thickness of about 2 mm or less. The chemical toughening method is a technology that improves the strength and hardness of a glass by exchanging alkali ions having a small ion radius (generally Na ions) that are present inside the glass with alkali ions having a large ion radius (generally K ions) under predetermined conditions.

FIG. 1 is a conceptual view schematically showing the cross-section of a chemically-toughened glass.

As shown in FIG. 1, a compressive stress layer is formed on the surface of the chemically-toughened glass, and a tensile stress layer or a central tension layer is formed inside the glass due to the reaction. Bending strength and mechanical strength are increased by the high compressive stress of the surface.

It is difficult to mechanically cut the toughened glass or machine its contour after toughening due to its characteristics and the absence of techniques for machining them. Therefore, the toughened glass is manufactured by a method of cutting and machining a raw glass plate before toughening the glass plate. However, this method has the drawback of low productivity since production costs such as personnel expenses are high and the breakage ratio of half-finished products is high due to a large number of manual processes. Furthermore, the importance of the yield is increasing due to the increasing size of mobile displays. It is becoming more difficult to apply this method of toughening a piece of glass after cutting and machining it to a mass production process.

Accordingly, the development of technologies for cutting and machining a raw glass plate after toughening it is actively underway.

However, as for a chemically-toughened glass that has a depth of layer (DOL) of about 20 μm or greater and a surface compressive stress of 600 MPa or greater, it is generally impossible to cut the glass using a mechanical wheel.

FIG. 2 shows pictures taken from the cross-section of a piece of gorilla glass available from Corning Inc. that is cut by wheel scribing. The part (a) in FIG. 2 is a picture taken from the cross-section, and the part (b) in FIG. 2 is a picture taken from the planar surface. As shown in the part (a) in FIG. 2, it can be appreciated that a median crack is not uniformly formed when the toughened glass having a high compressive stress of 600 MPa or greater in the surface is wheel-scribed. In addition, as shown in the part (b) in FIG. 2, it can be appreciated that a large amount of chipping occurs on the surface of the toughened glass having a DOL of 20 μm or greater when it is wheel-scribed.

In order to overcome these problems, a method of using a toughened glass that has a DOL of about 20 μm with which wheel scribing can be conducted, while having a surface stress of 600 MPa or greater was proposed. However, such a toughened glass also has a problem in that the direction of scribing cannot be controlled since crack-out occurs during wheel scribing when the thickness of the glass is 0.7 t or less, even though the glass can be wheel-scribed at a thickness of 1.0 t or greater.

In addition, in order to overcome this problem, a technology for cutting a toughened glass using a laser can be employed. However, this laser-based cutting technology has drawbacks in that process conditions are very complicated and equipment is very expensive. Therefore, this technology is not appropriate to a manufacturing process that requires a low cost and a high yield.

The information disclosed in the Background of the Invention section is provided only for better understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a cutting method and cutting stage for toughened glass with which a piece of toughened glass can be cut without the occurrence of crack-out.

In an aspect of the present invention, provided is a cutting method of toughened glass which is strengthened by forming a compressive stress in the surface of a raw glass plate. The method includes the following steps of: reducing the central tension inside a cutting portion of a piece of toughened glass that is to be cut by concavely bending the piece of toughened glass such that the cutting portion becomes a trough; and cutting the piece of toughened glass by forming a median crack in the cutting portion.

According to an exemplary embodiment of the present invention, the step of reducing the central tension may reduce the central tension in a part of the cutting portion where the median crack is to be formed to 20 MPa or less.

The median crack may be formed to a depth of 20% or less of the thickness of the piece of toughened glass from the surface of the piece of toughened glass.

The depth of layer (DOL) of the piece of toughened glass may be 25 μm or less.

The surface compressive stress of the piece of toughened glass may be 600 MPa or greater.

The median crack may be formed by wheel scribing.

The step of cutting the piece of toughened glass may include breaking the piece of toughened glass by expanding the median crack after forming the median crack.

The piece of toughened glass may be produced by chemically toughening the raw glass plate.

In another aspect of the present invention, provided is a cutting stage of toughened glass on which a piece of toughened glass that is to be cut is seated. The stage includes a concave support surface on which the piece of toughened glass is seated; and a vacuum hole formed in the support surface, the vacuum hole allowing the piece of toughened glass which is seated on the support surface to be affixed by vacuum.

According to embodiments of the present invention, it is possible to cut a piece of toughened glass without crack-out or chipping by reducing the central tension inside the cutting portion.

In addition, it is possible to cut a piece of toughened glass in a simple fashion and at a low cost, thereby improving cost competitiveness.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
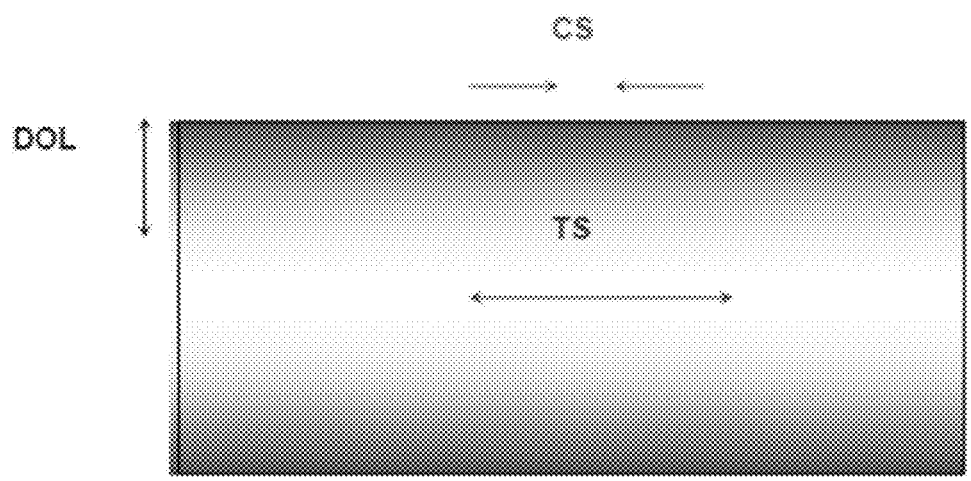
FIG. 1 is a conceptual view schematically showing the cross-section of a chemically-toughened glass.
Figure 2:
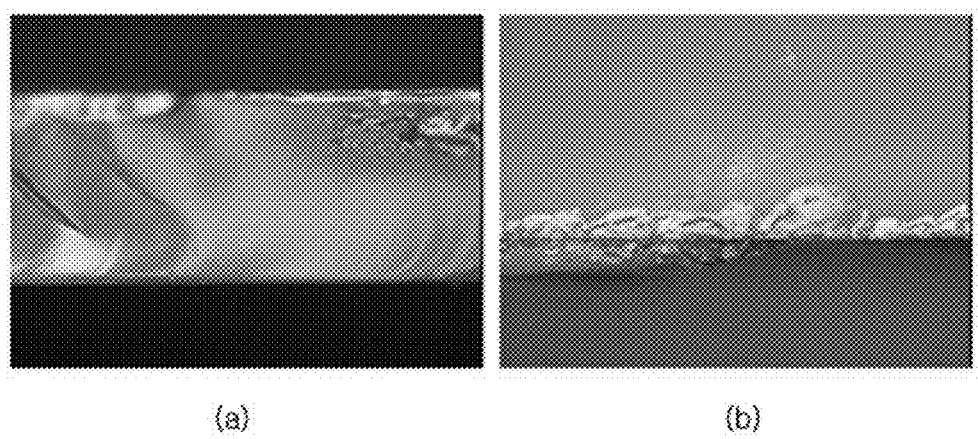
FIG. 2 shows pictures taken from the cross-section of a piece of gorilla glass available from Corning Inc. that is cut by wheel scribing.

Reference will now be made in detail to a cutting method and cutting stage of toughened glass according to the present invention, embodiments of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

Figure 3:
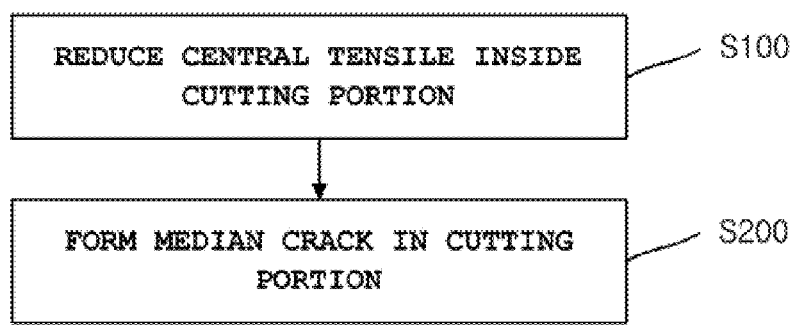
FIG. 3 is a schematic flowchart showing a cutting method for toughened glass according to an embodiment of the present invention.

FIG. 3 is a schematic flowchart showing a cutting method for toughened glass according to an embodiment of the present invention.

Referring to FIG. 3, the cutting method for toughened glass according to an embodiment of the present invention may include a central tension reducing step S100 and a cutting step S200.

In order to divide a piece of toughened raw glass into unit pieces of glass having an intended size, at S100, first, central tension present inside a cutting portion of the toughened glass is reduced.

Toughened glass is a type of glass that is obtained by forming a compressive stress of the surface of a raw glass plate such that it has a high bending strength and a high mechanical strength. Although toughened glass is manufactured by chemical toughening, thermal tempering, or the like, it may be made by a variety of other methods as long as they can induce a compressive stress of the glass surface.

It is preferred that the depth of layer (DOL) of the toughened glass be 25 μm or less.

It is also preferred that the surface compressive stress of the toughened glass be 600 MPa or greater.

While the surface of the toughened glass has a high compressive stress, the inside of the toughened glass has a high central tension due to the reaction to the compressive stress of the surface. This high central tension induces crack-out in the process of cutting the toughened glass. Specifically, in the process of forming a median crack in the toughened glass by wheel scribing that is intended to cut the toughened glass, when the median crack arrives at a part having a high central tension, the speed at which the crack propagates rapidly increases and exceeds the speed of scribing. Accordingly, crack-out occurs in which cracks grow irrespective of the direction of scribing. It is empirically observed that crack-out occurs at a central tension of about 20 MPa or greater.

Table 1 presents the thicknesses of glass, DOLs, sizes of maximum compressive stress (CS) and calculated average values of central tension (CT) depending on the DOLs.

TABLE 1

| Thickness of glass (mm) | DOL (μm) | Max. CS (MPa) | Avg. CT (MPa) |
| --- | --- | --- | --- |
| 1.0 | 20 | 700 | 14.6 |
| 1.0 | 25 | 700 | 18.4 |
| 0.7 | 20 | 700 | 21.2 |
| 0.7 | 25 | 700 | 26.9 |
| 0.5 | 20 | 700 | 30.4 |
| 0.5 | 25 | 700 | 38.9 |

As presented in Table 1 above, since the average central tension of a glass having a thickness of 0.7 t or less is 20 MPa or greater, crack-out as described above occurs when the glass is cut by wheel scribing.

Figure 4:
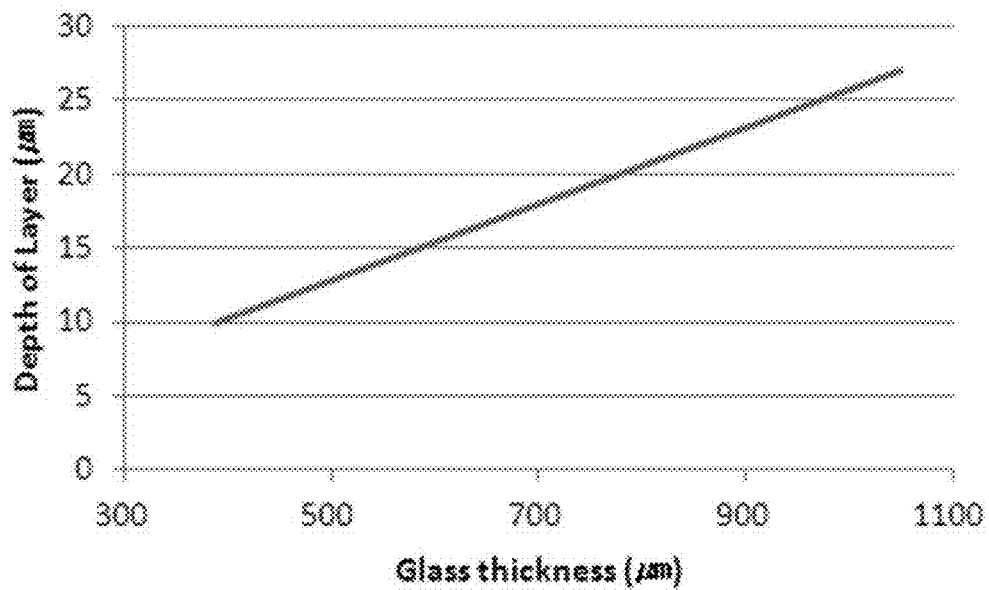
FIG. 4 is a graph showing variations in a depth of layer (DOL) depending on the thickness of glass at a compressive stress (CS) of 700 MPa and a central tension (CT) of 20 MPa.

FIG. 4 is a graph showing variations in the depth of layer (DOL) depending on the thickness of a glass at a compressive stress (CS) of 700 MPa and a central tension (CT) of 20

MPa. When the glass is wheel-scribed to at least a depth presented in FIG. 4, crack-out is caused by a high central stress inside the glass.

Accordingly, the cutting method of toughened glass according to the present invention reduces the central tension inside the cutting portion by concavely bending the toughened glass such that the cutting portion of the toughened glass becomes a trough before forming a median crack in the cutting portion in order to prevent crack-out from occurring during the cutting process.

When the cutting portion is bent into the concave shape, the surface of the cutting portion is subjected to a compressive stress, which cancels the central tension inside the cutting portion.

Figure 5:
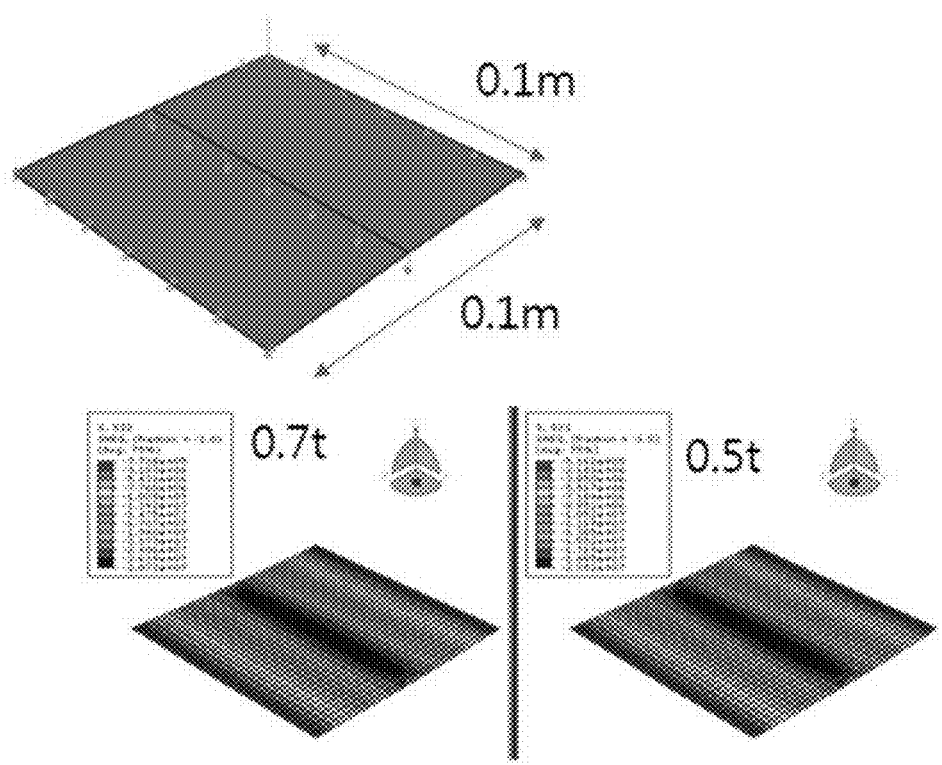
FIG. 5 shows numerical analysis results obtained by calculating a compressive stress that occurs when glass is bent.

FIG. 5 shows numerical analysis results obtained by calculating a compressive stress that occurs when pieces of glass are bent. Specifically, FIG. 5 is a result obtained by calculating compressive stresses that occur when pieces of glass having a size of 0.1 m*0.1 m are bent such that their cutting lines are lowered by 0.9 mm. Here, the size of one piece of glass is 0.7 t, and the size of the other piece of glass is 0.5 t.

As shown in FIG. 5, it can be appreciated that, when the pieces of glass are concavely bent, the compressive stress is greatest in the concavely-bent surface (A-side surface) and decreases in the depth direction. It can also be appreciated that, in the piece of glass having a thickness of 0.7 t, a compressive stress ranging from 17 to 28 MPa is formed in the part from the surface to a depth of 140 μm. In addition, the piece of glass having a thickness of 0.5 t is subjected to a compressive stress that is about 70% of that of the 0.7 t glass. This compressive stress can cancel the central tension inside the cutting line, thereby prevent crack-out from occurring during the cutting process. Since the compressive stress that occurs due to the bending of the toughened glass is sufficient when it can reduce the central tension inside the glass, the degree of bending will be properly controlled to the degree at which the central tension inside the glass can be reduced.

Preferably, the central tension reducing step S100 can reduce the central tension in the part of the cutting portion where the median crack will be formed to 20 MPa or less.

Afterwards, at S200, the piece of toughened glass is cut by forming a median crack in the concavely-bent cutting portion to a predetermined part (depth) in the depth direction.

Since the central tension inside the cutting portion is reduced due to the concave bending of the cutting portion, it is possible to cut the cutting portion without crack-out even if the median crack is formed in the cutting portion.

The toughened glass is cut as the median crack is gradually propagated or in the process in which the toughened glass is restored to the planar surface.

Figure 6:
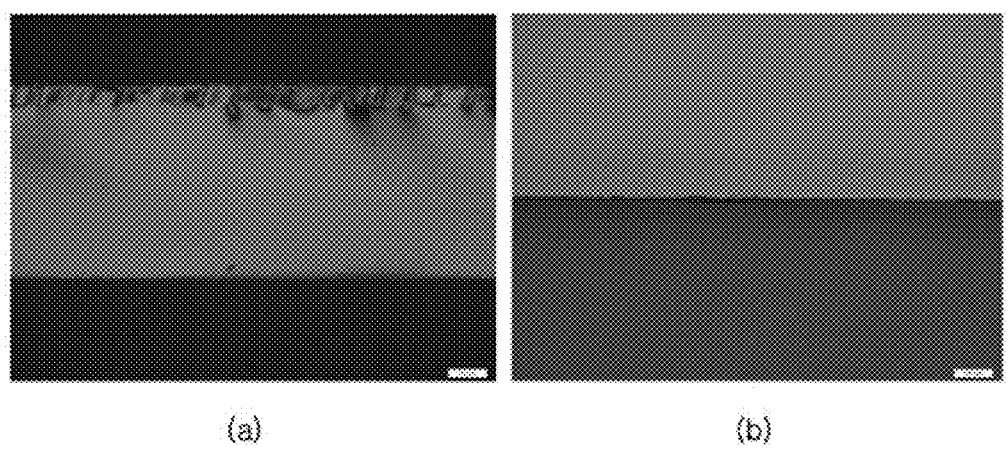
FIG. 6 shows pictures taken from the cross-section of a piece of toughened glass which is cut by a cutting method according to an embodiment of the present invention.

FIG. 6 shows pictures taken from the cross-section of a piece of toughened glass which is cut by a cutting method according to an embodiment of the present invention. The part (a) in FIG. 6 is a picture taken from the cross-section, and the part (b) in FIG. 6 is a picture taken from the planar surface. As shown in the part (a) in FIG. 6, it can be appreciated that median crack is uniformly formed in the surface of the piece of toughened glass according to the present invention. In addition, as shown in the part (b) in FIG. 6, it can be appreciated that no specific chipping is formed in the surface of the piece of toughened glass.

The median crack can be formed by wheel scribing. In other words, it is possible to cut the piece of toughened glass by forming a crack on the cutting line using a scribing wheel having a high level of hardness.

The median crack can be formed to a depth of 20% or less of the thickness of the piece of toughened glass from the surface of the piece of toughened glass.

In addition, the cutting method of toughened glass according to the present invention can further include the process of breaking the piece of toughened glass by expanding the median crack after forming the median crack.

The breaking process refers to the process of cutting the piece of toughened glass by applying a bending stress to the median crack when the piece of toughened glass is not cut by the median crack.

Figure 7:
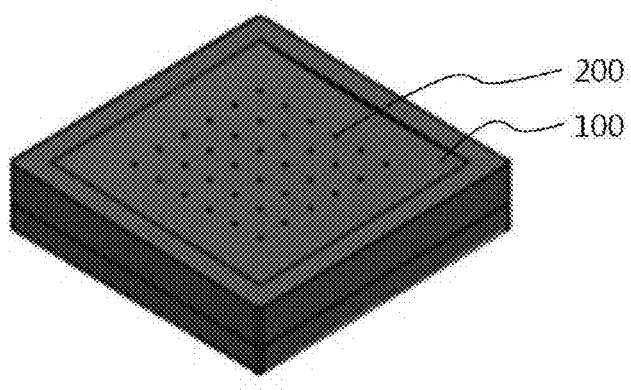
FIG. 7 is a conceptual view schematically showing a cutting stage of toughened glass according to another embodiment of the present invention.
Figure 8:
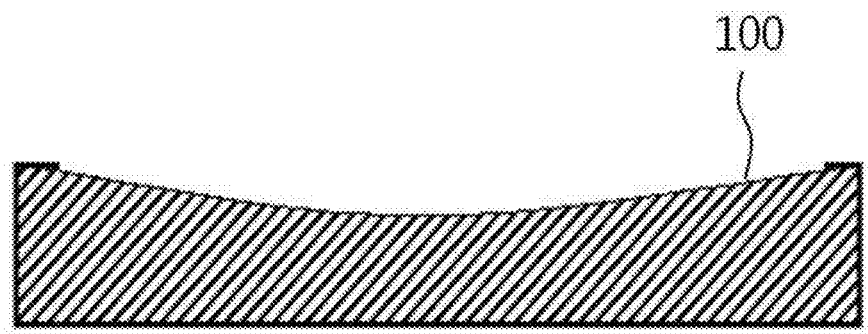
FIG. 8 is a cross-sectional view schematically showing the cross-section of the cutting stage according to another embodiment of the present invention.

FIG. 7 is a conceptual view schematically showing a cutting stage of toughened glass according to another embodiment of the present invention, and FIG. 8 is a cross-sectional view schematically showing the cross-section of the cutting stage according to another embodiment of the present invention.

Referring to FIG. 7 and FIG. 8, the cutting stage of toughened glass according to the present invention can have a concave support surface 100 on which a piece of toughened glass is to be seated and vacuum holes 200 formed in the support surface 100, the vacuum holes 200 allowing the piece of toughened glass which is seated on the support surface 100 to be affixed by vacuum.

The support surface 100 is a surface which supports the piece of toughened glass to be cut thereon, and has a concave shape.

The vacuum holes 200 are formed in the support surface 100, and serve to affix the piece of toughened glass seated on the support surface 100 by vacuum suction that is propelled by a vacuum suction device.

When the piece of toughened glass is drawn by vacuum through the vacuum holes 200 after the piece of toughened glass is seated on the concave support surface 100, the piece of toughened glass is affixed to the support surface 100 while being concavely bent along the shape of the support surface 100.

When the piece of toughened glass seated on the support surface 100 is affixed, a scribing unit (not shown) positioned above the stage scribes the piece of toughened glass, thereby forming a median crack.

The scribing unit (not shown) can be implemented as a variety of devices that is used in toughened glass cutting processes of the related art.

When the scribing unit (not shown) forms the median crack, the piece of toughened glass is cut as the crack is gradually propagated or in the process in which the toughened glass is restored to the planar state by removal of vacuum.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A cutting method of toughened glass which has been strengthened by having induced a compressive stress in a surface of a raw glass plate, the method comprising:

reducing a tensile stress in an interior of a thickness of a cutting portion of a piece of toughened glass where a median crack is to be formed to a reduced stress having a maximum value within the thickness of the cutting portion of no greater than 20 MPa or any positive or negative value therebelow comprising concavely bending the piece of toughened glass such that the cutting portion becomes a trough;

while the maximum value of the reduced stress within the thickness of the cutting portion where the median crack is to be formed remains at or below 20 MPa, scribing the piece of toughened glass from a surface of the cutting portion to a depth inside the interior of the thickness of the toughened piece of glass thereby forming the median crack, wherein the depth of the scribing is greater than a depth of layer from the surface of the cutting portion; and then breaking the scribed piece of toughened glass by expanding the median crack in the cutting portion of the toughened glass, comprising restoring the piece of toughened glass to a state less concavely bent than in the state in which the piece of toughened glass is scribed.

2. The cutting method of claim 1, wherein the median crack is formed to a depth of 20% or less of a thickness of the piece of toughened glass from a surface of the piece of toughened glass.

3. The cutting method of claim 1, wherein the depth of layer (DOL) of the piece of toughened glass is 25 µm or less.

4. The cutting method of claim 1, wherein a stress of the piece of toughened glass at the surface of the cutting portion is a compressive stress, having a negative value of 600 MPa or lower.

5. The cutting method of claim 1, wherein the scribing comprises wheel scribing.

6. The cutting method of claim 1, wherein the piece of toughened glass is a piece of chemically toughened glass.

7. The cutting method of claim 1, wherein the thickness of the piece of toughened glass ranges from 0.5 to 0.7 mm.

8. The cutting method of claim 1, wherein reducing the stress in the interior of the thickness of the cutting portion of the piece of toughened glass comprises seating the piece of toughened glass on a cutting stage, and affixing the piece of toughened glass to a concave support surface of the cutting stage by vacuum suction through a vacuum hole formed in the concave support surface such that the piece of toughened glass is concavely bent.

* * * * *